(12) United States Patent
Rogers et al.

(10) Patent No.: US 8,700,571 B2
(45) Date of Patent: Apr. 15, 2014

(54) SYSTEM AND METHOD FOR OPTIMIZING PROTECTION LEVELS WHEN REPLICATING DATA IN AN OBJECT STORAGE SYSTEM

(75) Inventors: Richard Rogers, Stoughton, MA (US); Benjamin Isherwood, Tewksbury, MA (US); Matthew Michael McDonald, Quincy, MA (US); Donald P. Pannese, Westford, MA (US); David Pinkney, Andover, MA (US)

(73) Assignee: Hitachi Data Systems Corporation, Santa Clara, CA (US)

(*) Notice: Subject to any disclaimer, the term of this patent is extended or adjusted under 35 U.S.C. 154(b) by 98 days.

(21) Appl. No.: 12/889,698

(22) Filed: Sep. 24, 2010

(65) Prior Publication Data
US 2012/0079424 A1 Mar. 29, 2012

(51) Int. Cl.
*G06F 17/30* (2006.01)
(52) U.S. Cl.
USPC .............................. 707/640; 707/655; 707/661
(58) Field of Classification Search
USPC .......................................... 707/640, 655, 661
See application file for complete search history.

(56) References Cited

U.S. PATENT DOCUMENTS

| 7,155,466 | B2 | 12/2006 | Rodriguez et al. |
| 2006/0026219 | A1 | 2/2006 | Orenstein et al. |
| 2007/0189153 | A1 | 8/2007 | Mason |
| 2008/0168224 | A1* | 7/2008 | Davison ........................ 711/114 |
| 2011/0106802 | A1* | 5/2011 | Pinkney et al. ............... 707/737 |

* cited by examiner

*Primary Examiner* — Hung Q Pham
(74) *Attorney, Agent, or Firm* — Mattingly & Malur, PC (57) ABSTRACT

A redundant array of independent nodes are networked together. Each node executes an instance of an application that provides object-based storage. The nodes are grouped into a plurality of systems each having multiple nodes. A data protection level method comprises setting a numerical value of a system dynamic data protection level for each system of nodes; and in response to user input, setting a value of a data protection level for one or more data objects in a system, the value being a fixed numerical value or a dynamic value. If the one or more data objects have a dynamic value of the data protection level in a system, the one or more data objects inherit the system dynamic data protection level of the system in which the one or more data objects reside. The value of the data protection level represents a number of copies of data of the one or more data objects to be kept where the one or more data objects reside.

14 Claims, 9 Drawing Sheets

SYSTEM AND METHOD FOR OPTIMIZING PROTECTION LEVELS WHEN REPLICATING DATA IN AN OBJECT STORAGE SYSTEM

BACKGROUND OF THE INVENTION

The present invention relates generally to storage systems and, more particularly, to system and method for optimizing protection levels when replicating data in an object storage system.

Different storage devices provide different levels of data protection (for example, a RAIN system versus a SAN system with RAID 6 and battery backup). In prior systems, the data protection level (DPL) of an object is fixed across all systems. When replicating content between two systems with different classes of storage devices, the fixed data protection level can lead to over-protection or under-protection of the data. For example, if an object started on an HCP (Hitachi Content Platform) 300 (RAIN) system with DPL=2 and was replicated to an HCP 500 (SAN) system, the DPL for the replicated object would still be 2. The HCP would make sure that there are two copies of the object on the replica system. With an HCP 500 replica system, however, the object may be over-protected based on the customer's needs/requirements.

BRIEF SUMMARY OF THE INVENTION

Exemplary embodiments of the invention provide a system and a method for configuring the system-wide DPL setting on each HCP system based on the system hardware. When tenants create namespaces, there is a new option for the DPL for the namespace which is "Dynamic." If this option is selected for the namespace, all objects in the namespace will have DPL of the system on which it resides (the primary system or the replica(s) or replica systems to which it is replicated). The system "dynamic DPL" value set at the system level is a dynamic value which is able to be changed by the system administrator at will and will immediately apply to all namespaces that have the "Dynamic" DPL setting selected.

An aspect of the present invention is directed to a redundant array of independent nodes networked together, wherein each node executes an instance of an application that provides object-based storage, the nodes being grouped into a plurality of systems each having multiple nodes. A data protection level method comprises setting a numerical value of a system dynamic data protection level for each system of nodes; and in response to user input, setting a value of a data protection level for one or more data objects in a system, the value being a fixed numerical value or a dynamic value. If the one or more data objects have a dynamic value of the data protection level in a system, the one or more data objects inherit the system dynamic data protection level of the system in which the one or more data objects reside. The value of the data protection level represents a number of copies of data of the one or more data objects to be kept where the one or more data objects reside.

In some embodiments, each system is logically partitioned into a plurality of namespaces, each namespace including a collection of data objects and has associated therewith a private file system with respect to other namespaces in the system. Setting a value of a data protection level for one or more data objects in a system comprises setting a value of a data protection level for a namespace containing the one or more data objects in the system, the value being a fixed numerical value or a dynamic value. If the namespace containing the one or more data objects has a dynamic value of the data protection level in a system, the namespace containing the one or more data objects inherits the system dynamic data protection level of the system in which the namespace resides. The numerical value of the system dynamic data protection level for each system is set in response to a user input. The numerical value of the system dynamic data protection level for each system is set based on one or more of characteristics of storage devices in the system, whether the data objects have been replicated, whether the data objects are still under retention, and age of the data objects.

In specific embodiments, when the one or more data objects are replicated from a source system to a target system of the plurality of systems, the one or more data objects replicated in the target system have the fixed numerical value for the data protection level if the value of the data protection level is set to the fixed numerical value, and the one or more data objects replicated in the target system inherit the numerical value of the system dynamic data protection level of the target system if the value of the protection level of the one or more data objects is set to the dynamic value.

In some embodiments, each system is logically partitioned into a plurality of namespaces, each namespace including a collection of data objects and has associated therewith a private file system with respect to other namespaces in the system. Setting a value of a data protection level for one or more data objects in a system comprises setting a value of a data protection level for a namespace containing the one or more data objects in the system, the value being a fixed numerical value or a dynamic value. If the namespace containing the one or more data objects has a dynamic value of the data protection level in a system, the namespace containing the one or more data objects inherits the system dynamic data protection level of the system in which the namespace resides. When the one or more data objects are replicated from a source system to a target system of the plurality of systems, the one or more data objects replicated in the target system have the fixed numerical value if the value of the data protection level of the namespace containing the one or more data objects is set to the fixed numerical value, and the one or more data objects replicated in the target system inherit the numerical value of the system dynamic data protection level of the target system if the value of the protection level of the namespace containing the one or more data objects is set to the dynamic value.

Another aspect of this invention is directed to an apparatus for establishing data protection level in a redundant array of independent nodes networked together, wherein each node executes an instance of an application that provides object-based storage, the nodes being grouped into a plurality of systems each having multiple nodes. The apparatus comprises a processor; a memory to store a numerical value of a system dynamic data protection level for each system of nodes and to store a value of a data protection level for one or more data objects in a system, the value being a fixed numerical value or a dynamic value; and a data protection level value module configured, if the data protection level of the one or more data objects is the dynamic value, to obtain the numerical value of the system dynamic data protection level of the system in which the one or more data objects reside and assign the obtained numerical value to be the value of the data protection level for the one or more data objects. The value of the data protection level represents a number of copies of data of the one or more data objects to be kept where the one or more data objects reside.

In some embodiments, the apparatus further comprises a user interface to receive a user input for setting the value of the data protection level for the namespace containing the one or more data objects in the system. The apparatus further comprises a user interface to receive a user input for setting the numerical value of the system dynamic data protection level for each system. The one or more data objects replicated in the target system have the fixed numerical value for the data protection level if the value of the data protection level of the one or more data objects is set to the fixed numerical value. Each system has a corresponding data protection level value module configured, if the data protection level of the one or more data objects is the dynamic value, to obtain the numerical value of the system dynamic data protection level of the system in which the one or more data objects reside and assign the obtained numerical value to be the value of the data protection level for the one or more data objects.

Another aspect of the invention is directed to an interface for establishing data protection level in a redundant array of independent nodes networked together; wherein each node executes an instance of an application that provides object-based storage, the nodes being grouped into a plurality of systems each having multiple nodes; wherein each system is logically partitioned into a plurality of namespaces, each namespace including a collection of data objects and has associated therewith a private file system with respect to other namespaces in the system; wherein the data protection level is established by setting a numerical value of a system dynamic data protection level for each system of nodes, and in response to user input, setting a value of a data protection level for a namespace containing one or more data objects in a system. The interface comprises computer readable program code devices for: displaying an area to receive a value of the data protection level of a namespace containing the one or more data objects, the value being a fixed numerical value or a dynamic value; receiving the value of the data protection level of the namespace from the user; and displaying the received value of the data protection level of the namespace. If the namespace containing the one or more data objects has a dynamic value of the data protection level in a system, the namespace containing the one or more data objects inherits the system dynamic data protection level of the system in which the namespace resides. The value of the data protection level represents a number of copies of data of the one or more data objects to be kept where the one or more data objects reside.

In some embodiments, the computer readable program code device for displaying an area to receive a value of the data protection level of a namespace containing the one or more data objects displays a drop-down menu providing selections of a dynamic value and one or more fixed numerical values. The interface further comprises computer readable program code devices for: displaying an area to receive a numerical value of the system dynamic data protection level of a system; receiving the numerical value of the system dynamic data protection level of the system; and displaying the received numerical value of the system dynamic data protection level of the system. The computer readable program code device for displaying an area to receive a numerical value of the system dynamic data protection level of a system displays a drop-down menu providing selections of a plurality of numerical values.

These and other features and advantages of the present invention will become apparent to those of ordinary skill in the art in view of the following detailed description of the specific embodiments.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for optimizing protection levels when replicating data in an object storage system.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

Figure 1:
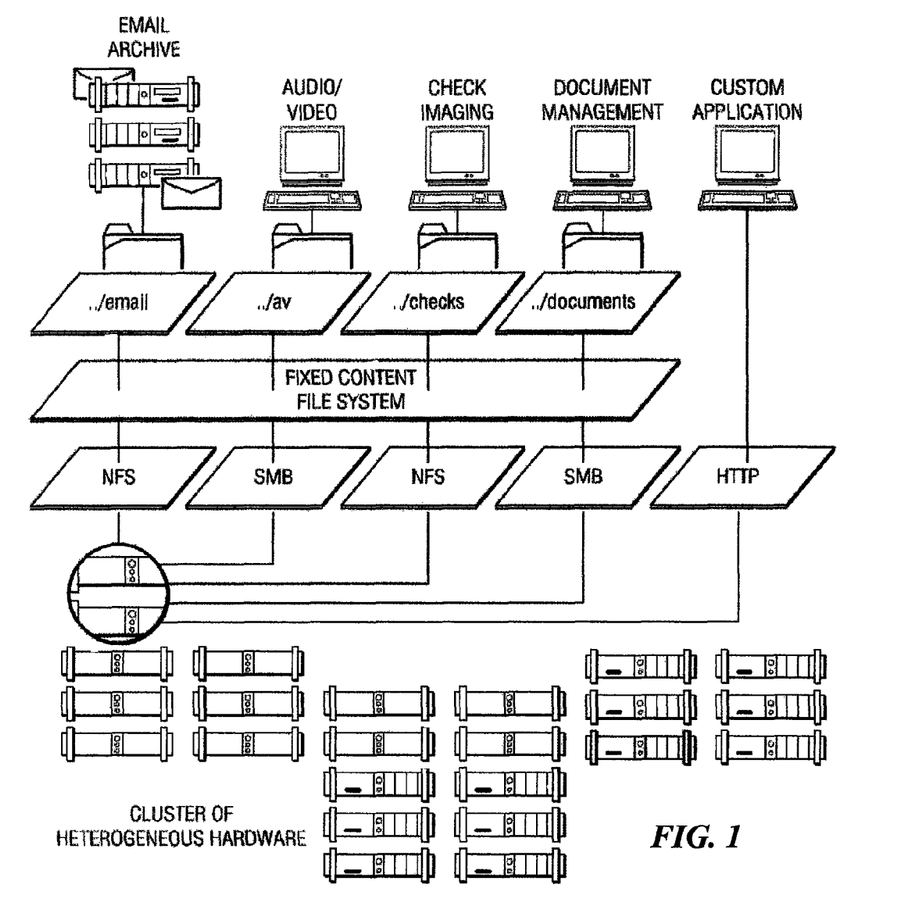
FIG. 1 is a simplified block diagram of a fixed content storage archive in which the method and apparatus of the invention may be applied.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
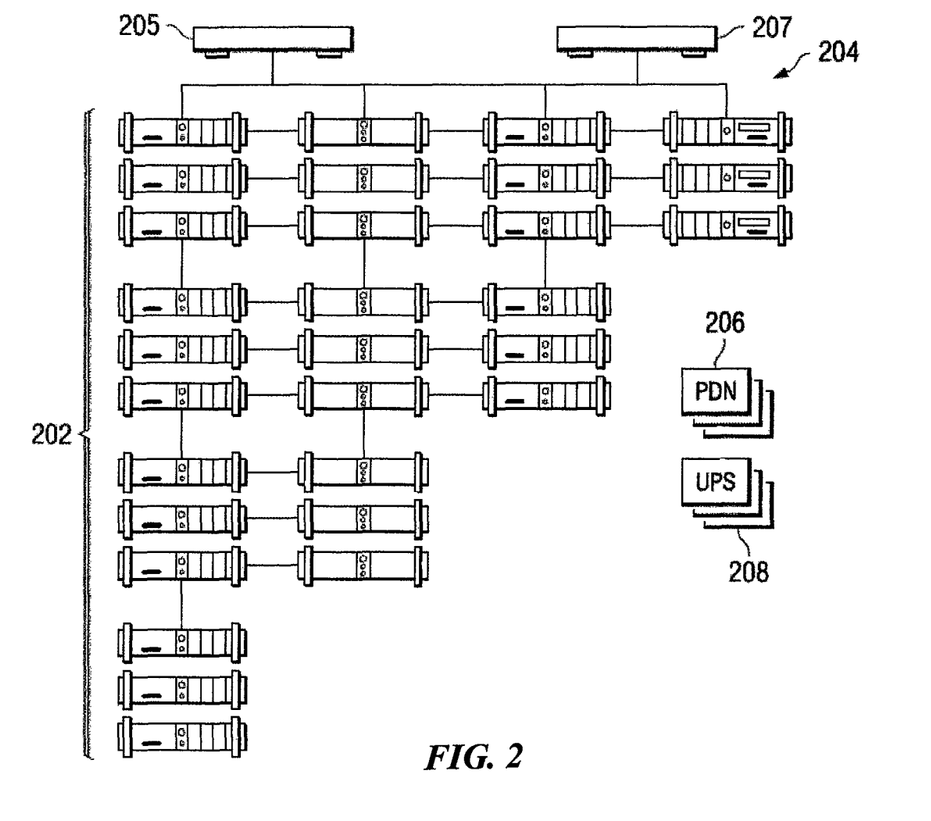
FIG. 2 is a simplified representation of a redundant array of independent nodes each of which is symmetric and supports an archive cluster application.

As described in commonly-owned U.S. Pat. No. 7,155, 466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

Figure 3:
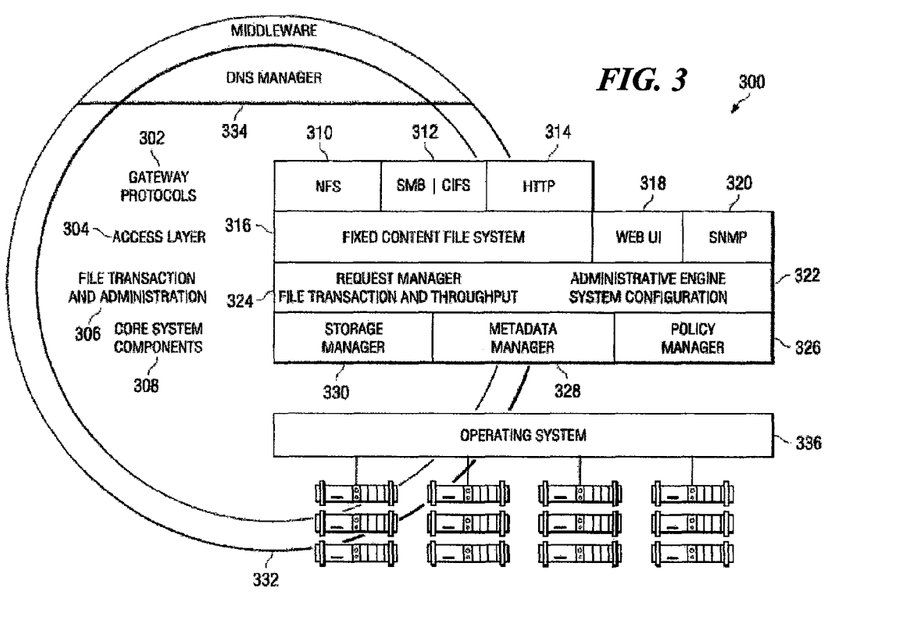
FIG. 3 is a high level representation of the various components of the archive cluster application executing on a given node.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publications 2007/0189153 and 2006/0026219, which are incorporated herein by reference.

II. Cluster Partitioning—Tenants & Namespaces

The following describes how an enterprise (or other entity, such as a service provider) can partition a cluster/system and use the cluster resources more effectively as the amount of user data to be stored increases. The following terminology applies to the subject matter. Data Account (DA) is an authenticated account that provides access to one or more namespaces. The account has a separate set of CRUD (create, read, update, and delete) privileges for each namespace that it can access. Namespace (NS) is a logical partition of the cluster. A namespace essentially serves as a collection of objects particular to at least one defined application. As will be described, each namespace has a private filesystem with respect to other namespaces. Moreover, access to one namespace does not grant a user access to another namespace. An archive may have an upper bound on the number of namespaces allowed on a single cluster (e.g., up to 100). Authenticated Namespace (ANS) is a namespace (preferably HTTP-only) that requires authenticated data access. Default Namespace (dNS) is a namespace for use with data that is ingested into the cluster in other than REST (Representational State Transfer), where REST is a lightweight protocol commonly used for exchanging structured data and type information on the Web. Further, even if an application uses the REST interface, if a namespace is not specified during authentication to the cluster, all data can be stored in the default namespace. Tenant is a grouping of namespace(s) and possibly other subtenants. Top-Level Tenant (TLT) is a tenant which has no parent tenant, e.g., an enterprise. Subtenant is a tenant whose parent is another tenant; e.g., the enterprise's financing department. Default Tenant is the top-level tenant that contains only the default namespace. Cluster (or system) is a physical archive instance, such as described above.

Figure 4:
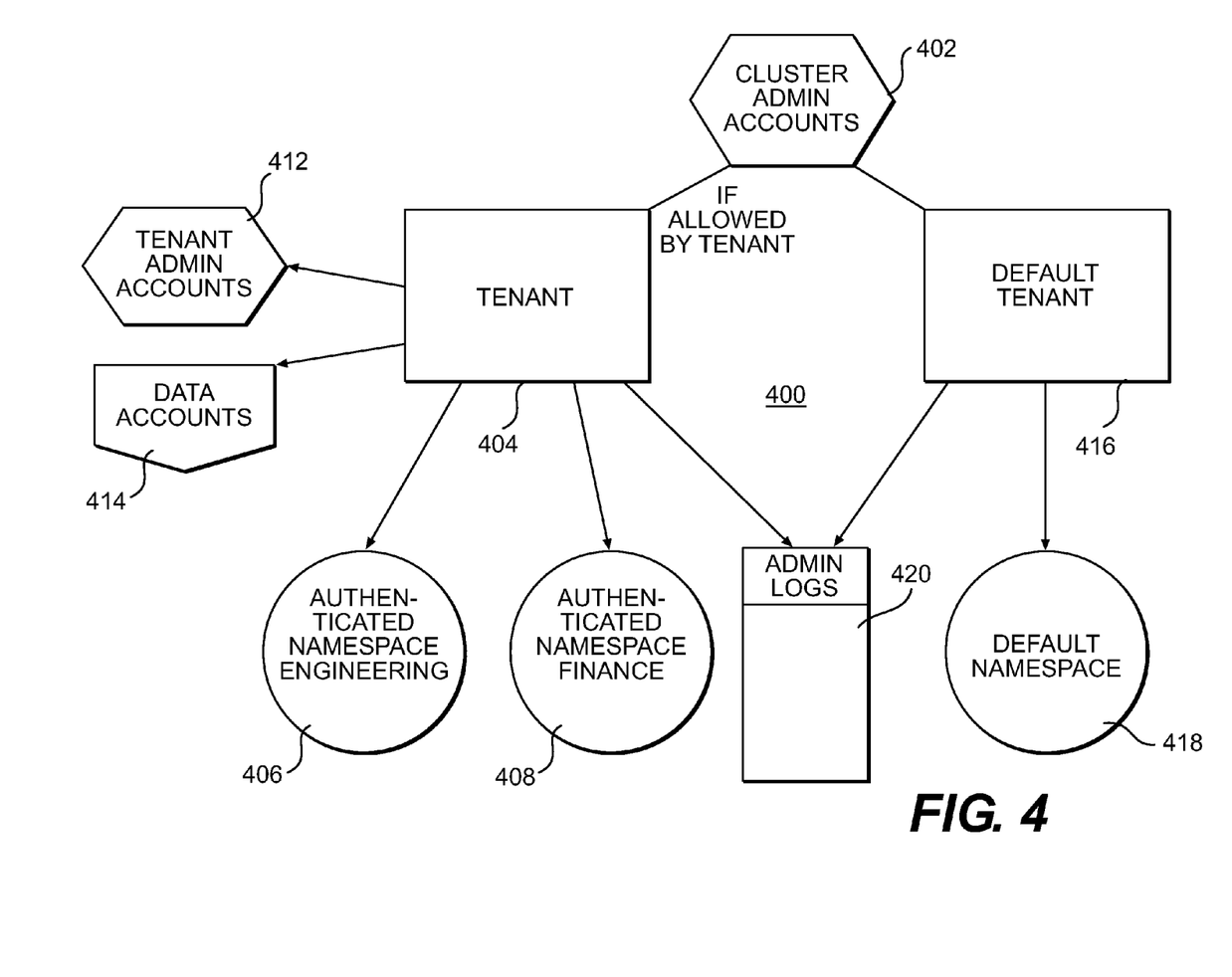
FIG. 4 illustrates an example of how a cluster is partitioned into tenants and namespaces.

When the cluster is freshly installed, it contains no tenants. Cluster administrators create top-level tenants and administrative accounts associated with those top-level tenants, and enable the default tenant and default namespace. FIG. 4 illustrates this basic concept. FIG. 4 shows a cluster instance 400, such as the system illustrated in FIGS. 2 and 3 and described above. A cluster administrator has an account 402. An appropriate administrator is given authority to create a top level tenant 404, and one or more namespaces for that TLT, such as first authenticated namespace 406 (for an engineering department) and a second authenticated namespace 408 (for a finance department). An appropriate administrator also sets up administrator accounts 412 and data accounts 414 for the TLT. In addition, an administrator can also enable a default tenant 416 having an associated default namespace 418. Although not shown, authorized administrators may also set up subtenants. The administrator also establishes administrative logs 420. Of course, the above configuration is merely exemplary, as the subject matter herein is not limited to any particular type of use case or tenant/namespace configuration.

At a macro level, all namespaces can be considered as the same or substantially the same entities with the same qualities and capabilities. Generally, and as will be seen, a namespace has a set of associated capabilities that may be enabled or disabled as determined by an appropriately credentialed administrator. A single namespace can host one or more applications, although preferably a namespace is associated with just one defined application (although this is not a limitation). A namespace typically has one or more of the following set of associated capabilities that a namespace administrator can choose to enable or disable for a given data account: read (r)—includes reading files, directory listings, and exists/HEAD operations; write (w); delete (d); purge (p)—allows one to purge all versions of a file; privileged (P)—allows for privileged delete and privileged purge; and search(es).

Using namespaces, and as illustrated generally in FIG. 4, an administrator can create multiple domains for a cluster, which domains differ based upon the perspective of the user/actor. These domains include, for example, the following: access application, cluster admin, TLT admin, subtenant admin, and replication. The domain of the access application is a given namespace. An authorized administrator (such as admin 402) has a view of the cluster as whole. As shown, the administrator 402 can create a top-level tenant and perform all of the administration for actions that have cluster scope. In certain situations, such as enterprise deployments, the tenant may grant appropriate administrators the ability to manage the tenant, in which case any cluster admin also will be able to function as a TLT admin. The TLT admin creates namespaces, data accounts, and subtenants. The TLT is able to modify some configuration settings, such as namespace quotas, or to enable versioning. The subtenant admin is able to create a namespace under a subtenant. The domain of replication is a set of TLTs defined by the cluster administrator while configuring replication between clusters.

One of ordinary skill in the art will appreciate that a tenant is a logical archive as viewed by an administrator. As shown in FIG. 4, a tenant may represent an organization or a department using a portion of a cluster. A tenant may be implemented as a hierarchy in that it can contain other tenants.

A tenant preferably has a set of attributes: namespaces, administrative accounts, data access accounts, permission mask, roll-up of state, name, and quotas. A tenant may contain zero or more namespaces. A tenant will have a set of administrative accounts (such as accounts 412) that enable users to monitor and update attributes of the tenant. The data access accounts are the set of accounts (such as accounts 414) which access namespace objects. A permission mask (r/w/d/p/P/s) is the set of permissions global to the tenant and that mask a namespace's permissions. The roll-up of state provides the metrics on all namespaces within the tenant. The name of the tenant is settable and changeable by an appropriate administrator. Tenant names within the same cluster must not collide. A top level tenant preferably is assigned a hard storage quota by the administrator. The appropriate admin can lower or raise that quota, and he or she can assign as much quota as desired. The TLT can also specify a soft quota, which is a given percentage of the hard quota. A tenant is able to divide its quota among one or more namespaces, but the total assigned quota may not exceed that of the tenant. For accounting purposes, preferably the quota will measure the rounded up size of an ingested file to the nearest block size. A soft quota is typically a predetermined percentage (e.g., 85%) of a hard quota, but this value may be configurable. Once the hard quota is exceeded, no further writes are allowed, although in-progress writes preferably are not blocked. It may be acceptable to have a delay between exceeding a quota and having future writes blocked. Preferably, quotas are replicated but cannot be changed. When a replica becomes writable, the quota is enforced there as well.

A tenant administrator also has a set of roles that include one or more of the following: a monitor role, an administrator role, a security role, and a compliance role. A monitor role is a read-only version of an administrator role. The administrator role is the primary role associated with a tenant. As described and illustrated above, this role allows an admin user to create namespaces under the current tenant, and it provides a view of all namespaces within this tenant (and associated statistics such as file counts, space available, space used, etc.). The administrator also can view tenant and namespace logs, and he or she can view/update tenant and namespace configuration. The security role gives a user the ability to create/modify/delete new administrative users. A user with the security role can add and delete roles from other tenant-level administrative accounts. When the tenant is first created, preferably there is one administrative user associated with the tenant, and this user account has just the security role. The compliance role enables privileged delete and retention class functions (as defined below).

A namespace is a logical archive as viewed by an application. According to the subject matter herein, a particular namespace is distinct from a different namespace, and access to one namespace does not grant a user access to another namespace. Preferably, administration of a namespace is performed at the owning tenant level. Moreover, preferably a namespace may only be deleted if a count of objects associated with that namespace is zero. A namespace preferably also has the following attributes: permission mask, initial settings, other settings, display name, quota, logs, and stats. As noted above, the permission mask (r/w/d/p/P/s) is the set of settings global to the namespace and which mask an account's permissions. The initial settings identify a data protection level (DPL), a hashing scheme, and the like, that preferably remain persistent. The other settings refer to settings (such as retention, shred, versioning, indexing, and the like) that can be set on the namespace and then later changed. The display name is a name or other identifier for the namespace. The quota is either hard (in GB) or soft (in percent). The logs attribute identifies the system events related to the namespace that will be logged. The stats attribute identifies the statistics that are generated from namespace-related data, such as capacity, number of objects, and the like.

Preferably, tenant names and namespace names are human readable identifiers in the various administrative user interfaces (UIs). Preferably, these names also are used in hostnames to specify the namespace of a data access request, the tenant which an administrator is administrating, and the scope over which a search should be confined. The namespace name is useful because a tenant may have more than one namespace associated with it. Preferably, object access over HTTP uses a hostname in the form of:

<namespace-name>.<tenant-name>.<cluster-domain-suffix>

These names comply with conventional domain name system (DNS) standards. As noted above, tenant names on a cluster must not collide.

III. Dynamic Data Protection Levels

According to embodiments of the present invention, a customer or a system user with the administrator role can configure the system-wide DPL setting on each HCP system based on the system hardware. When tenants create namespaces, there is a new option for the DPL for the namespace which is "Dynamic." If this option is selected for the namespace, all objects in the namespace with have DPL of the system on which it resides (the primary system and the replica(s) or replica systems to which it is replicated).

Before this dynamic DPL feature is available, the DPL was defined at the namespace level and associated with the object; therefore, the DPL for the object remains the same across all systems to which the object is replicated. If an object started on an HCP 300 (RAIN) system with DPL=2 and was replicated to an HCP 500 (SAN) system, the DPL for the object would still be 2. HCP would make sure that there are two copies of the object on the replica system. With an HCP 500 replica system, the object may be over-protected based on the customer's needs/requirements.

In the present invention, a system administrator will have the ability to set a system default or dynamic DPL value for each cluster/system of the various clusters/systems in an overall system and to set a namespace DPL value for each namespace in any cluster/system. The system dynamic DPL value will be applied to any namespace residing therein that has "dynamic" chosen for its namespace DPL setting.

Figure 5:
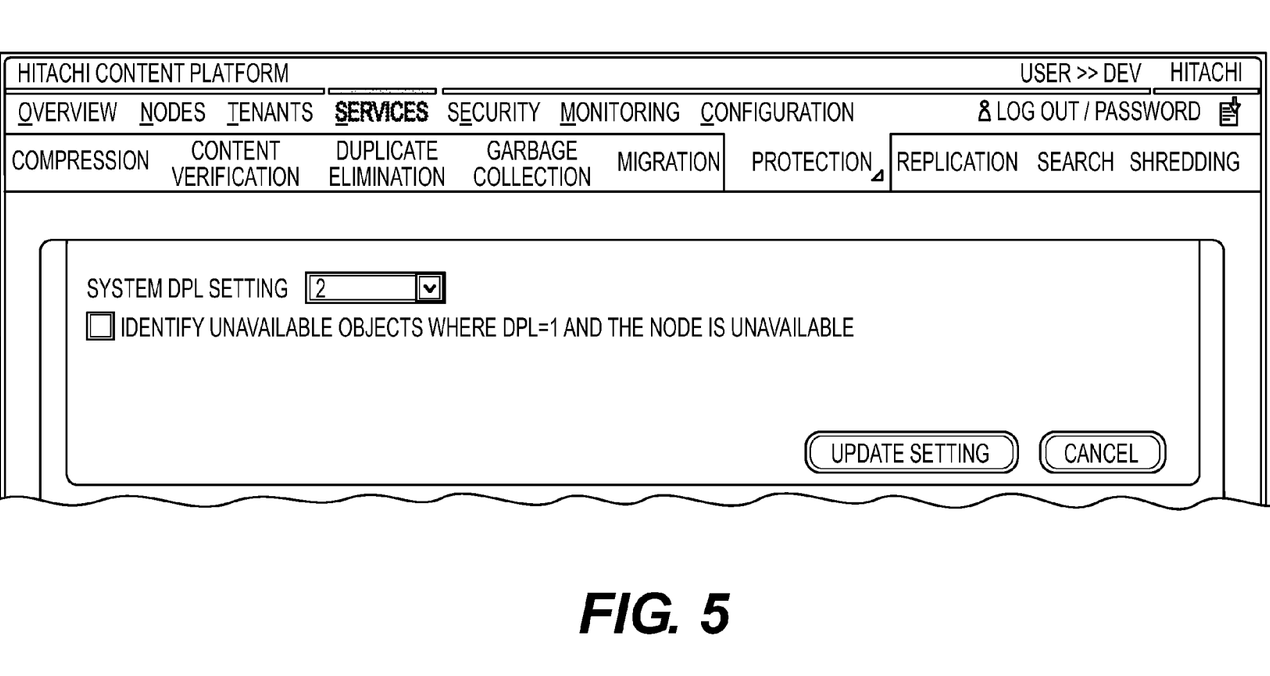
FIG. 5 illustrates an exemplary graphical user interface for specifying a system default or dynamic data protection level (DPL) setting for a cluster/system.
Figure 6:
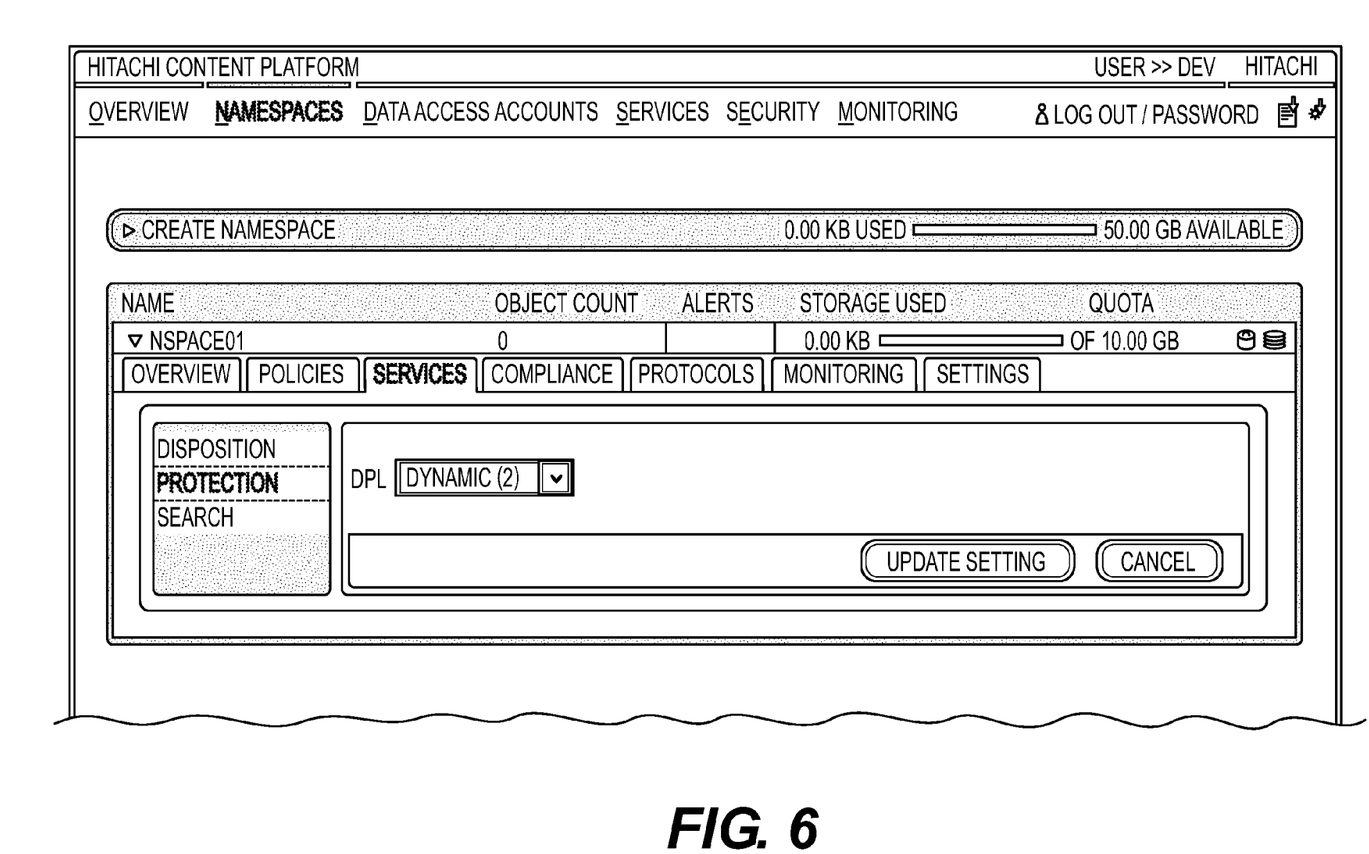
FIG. 6 illustrates an exemplary graphical user interface for specifying a namespace DPL setting for a namespace.

FIG. 5 illustrates an exemplary graphical user interface (GUI) for specifying a system default or dynamic DPL setting for a cluster/system. FIG. 6 illustrates an exemplary graphical user interface for specifying a namespace DPL setting for a namespace. In specific embodiments, the tenant administrator will have the ability to choose "dynamic" from the "DPL" pull down box on the "Create Namespace" page. For example, a drop-down menu has selections of "dynamic", 1, 2, and so on for specifying a namespace DPL setting. When "dynamic" is selected (via the GUI of FIG. 6), the value will be whatever numerical value to which the system administrator set for the system default DPL setting of the cluster/system on which the namespace resides (via the GUI of FIG. 5). The actual "Dynamic" integer value will be displayed and seen by a tenant administrator. The system default DPL value set at the system level is a dynamic value which is able to be changed by a system administrator at will. In a typical example, the system default DPL setting for new installs will be 1 for SAN and 2 for RAIN, and the system default DPL setting for upgrades will be 1 for SAN and 2 for RAIN.

III.A. System DPL and Replication

In order to support the above functionality, the "dynamic DPL" setting for the cluster is introduced along with option to choose "dynamic" for a namespace's DPL setting. The value set for the system default or dynamic DPL is used for objects in a namespace only if the namespace has "dynamic" selected as its namespace DPL setting. If this is the case, then whatever the system default DPL value set for the cluster where the namespace resides will be the DPL setting of the namespace. For example, Cluster A has a system default DPL setting of 2. The namespace NS1 is created on cluster A and "dynamic" is selected as its DPL setting. The number of Cluster A copies for the data within NS1 will be 2 (i.e., for any specific data (file) on Cluster A that resides in namespace NS1, there will be 2 copies of that data). NS1 gets replicated to Cluster B. Cluster B has a system default DPL setting of 1. NS1's DPL setting on Cluster B will still be "dynamic" but will have the same value as the system default for Cluster B which is 1. Therefore, the number of copies for the data within NS1 on Cluster B will be 1.

The following example further illustrates and clarifies the dynamic DPL feature of the present invention. Cluster A has a system default DPL setting of 2. The namespace NS1 is created on cluster A and "4" is selected as its DPL setting. The number of Cluster A copies for the data within NS1 will be 4. NS1 gets replicated to Cluster B (which is able to support a DPL of 4). Cluster B has a system default DPL setting of 1. NS1's DPL setting on Cluster B will still be "4." The number of copies for the data within NS1 on Cluster B will be 4.

The following is one example in which the system dynamic DPL level helps the user. If a user creates a namespace and opts into replication at the time the namespace is created and sets the DPL level to a value that the replica cluster is unable to maintain, that create operation will fail and the user will receive an error stating the reason.

III.B. Replication DPL Setting

One scenario in which the dynamic DPL feature is particularly useful is many-to-one cluster replication. By selecting a value of "dynamic" for the namespace DPL setting in the namespaces of the source clusters, the data replicated to the replica target cluster will inherit the system default or dynamic DPL setting of the replica target cluster. One use case for such a configurable value will involve the replication of multiple source clusters to one central target cluster. The source clusters are RAIN clusters where the system dynamic DPL for the data may be set to 2. The central target cluster is a SAN cluster where a system dynamic DPL of 1 is sufficient.

It is assumed that tenant administrators do not know anything about the replicated hardware and therefore will not know the system default DPL setting to set, other than to choose "dynamic" and trust that the cluster will do the right thing. Also when thinking about public cloud, a tenant administrator should not be able to affect the cluster administrator's replication policies in terms of how the data is protected and where it is protected. The tenant just pays to have their data replicated (or backed up) and trusts that the cluster (or cloud) administrator does the job correctly.

Figure 7:
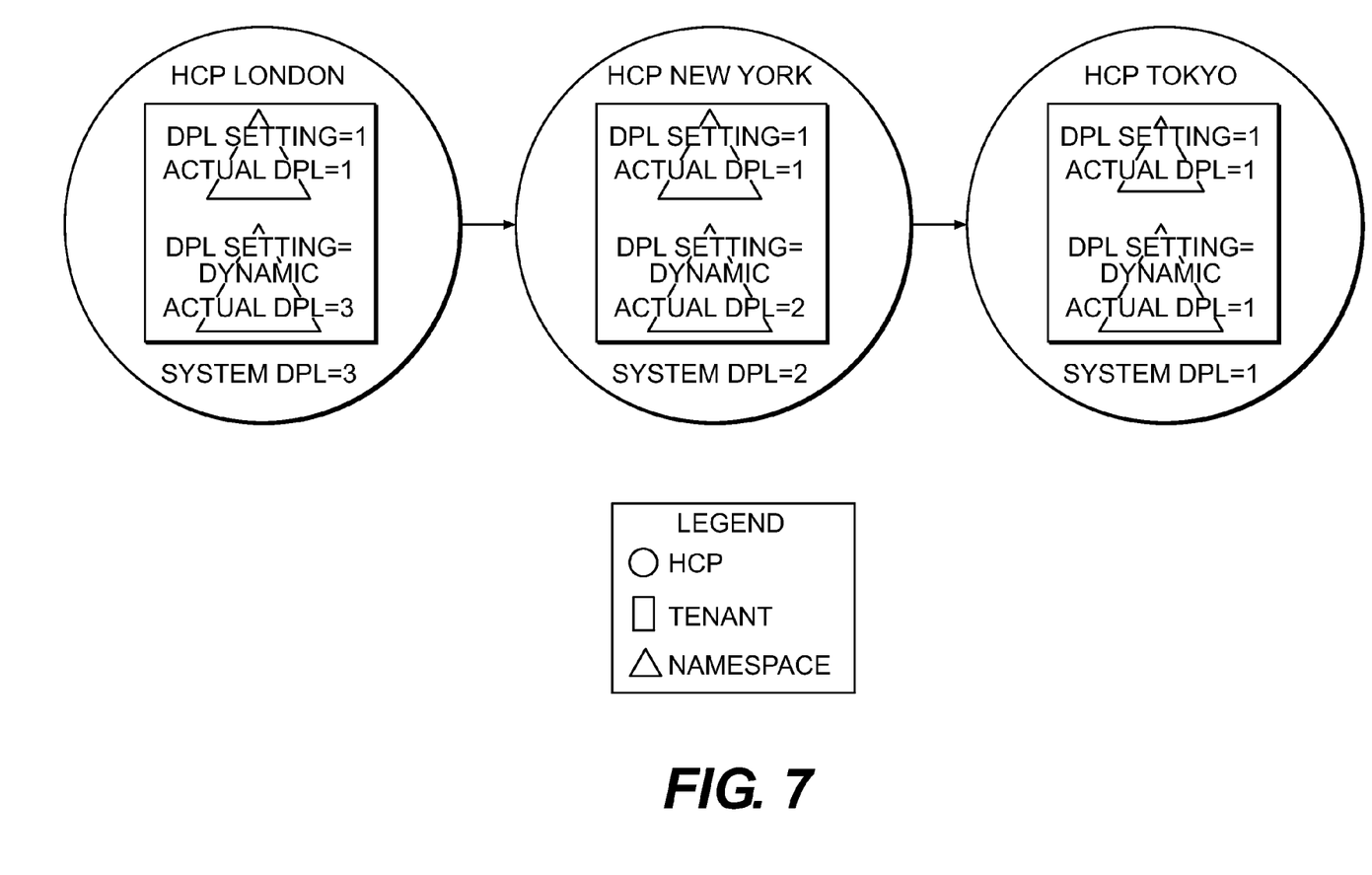
FIG. 7 shows an example of two namespaces being replicated in a chain topology.
Figure 8:
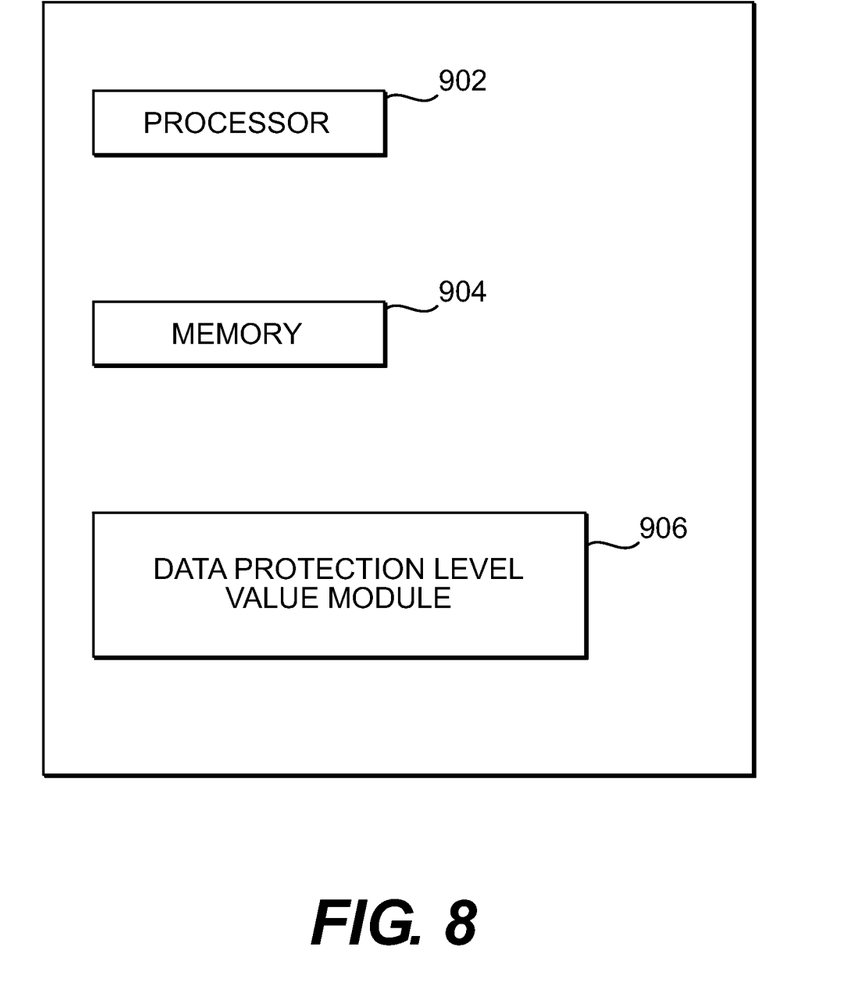
FIG. 8 shows a simplified block diagram of an apparatus for establishing the data protection level according to one embodiment of the invention.

FIG. 7 shows an example of two namespaces being replicated in a chain topology. The first namespace has DPL=1 and the second namespace has DPL=Dynamic. The diagram below shows the Actual DPL when the namespace is replicated, the DPL for each object in the namespace. The actual DPL of the first namespace is 1 and does not change. In the first (source) cluster, the system default or dynamic DPL is 3, so that the DPL for the second namespace is 3. In the second (middle) cluster, the system default or dynamic DPL is 2, so that the DPL for the second namespace is 2. In the third (final target) cluster, the system default or dynamic DPL is 1, so that the DPL for the second namespace is 1.

III.C. Apparatus and Process for Establishing DPL

Figure 9:
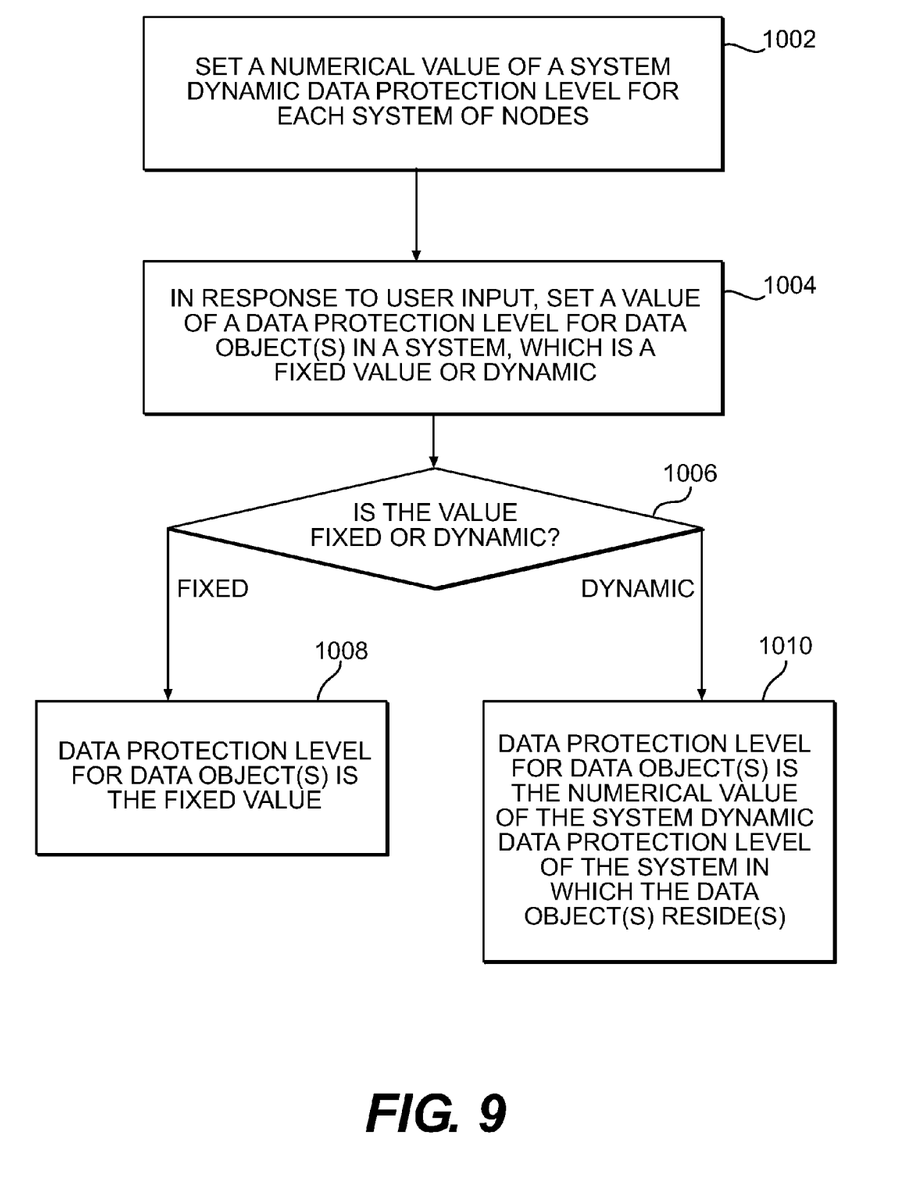
FIG. 9 shows an example of a flow diagram illustrating a process for assigning a data protection level for data object(s).

FIG. 9 shows a simplified block diagram of an apparatus for establishing the data protection level according to one embodiment of the invention. The apparatus includes a processor 902, a memory 904, and a data protection level value module 906. The memory 904 stores programs and data, including the value of the system dynamic data protection level for a system and the values of the data protection levels for namespaces in the system. The data protection level value module 906 is configured, if the data protection level of a namespace is set to a dynamic value, to obtain the numerical value of the system dynamic data protection level of the system in which the one or more data objects reside and assign the obtained numerical value to be the value of the data protection level for the namespace. In specific embodiments, each system in the overall system of redundant array of independent nodes networked together has such an apparatus including the processor 902, the memory 904, and the data protection level value module 906. The data protection level value module 906 may be implemented in hardware or in software and stored in the memory 904.

FIG. 10 shows an example of a flow diagram illustrating a process for assigning a data protection level (DPL) for data object(s). In step 1002, a system administrator sets a numerical value of a system dynamic DPL for each system of nodes. In step 1004, a user inputs a value to set a DPL for one or more data objects in a particular system. The value is a fixed numerical value or a dynamic value. If it is determined that the value is fixed in step 1006, the DPL for the data object(s) is the fixed numeral value in step 1008. If it is determined that the value is dynamic in step 1006, the DPL for the data object(s) is the numerical value of the system dynamic DPL of the system in which the one or more data objects reside in step 1010. In specific embodiments, data protection levels are set for various namespaces in the system, and the one or more data objects will have the DPL of the namespace to which they belong.

III.D. Stored Object and DPL

When an object is stored within a namespace, that object is given the int dpl value of the namespace in which the object is stored. At this point in time, the object will have a desired DPL value and an actual DPL value that are equal. If/when a namespace has its DPL value changed after an object (or objects) have been stored in the namespace (i.e., the namespace is set to "dynamic" and the dynamic setting is changed), the object will continue to have an actual DPL setting that was given to it at the time of ingest but a desired DPL value that is equal to the new dynamic value. The object DPL state remains this way until the protection policy runs. Once the protection policy runs, it will either reduce the number of object copies or increase the number of object copies by the absolute value delta between the desired and actual DPL settings on the object.

The object desired DPL is not explicitly stored with the object but rather implicitly stored with the object based on the namespace where the object is located. When the desired DPL is requested from the object, the object looks up the namespace where it is stored and returns the reported DPL value of the namespace. Again, if the namespace is set to "dynamic," then it is the cluster setting that is returned.

Of course, the system configuration illustrated in FIG. 1 is purely exemplary of a storage archive in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for optimizing protection levels when replicating data in an object storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In a system having a plurality of nodes and logically partitioned into a plurality of namespaces, an establishing data protection level method comprising:

setting a value of a system data protection level for the system;

receiving from a user a value of a data protection level for a namespace of the plurality of namespaces; and receiving a selected option of a plurality of options for a data protection level to the namespace, the selected option for the data protection level being either a fixed numerical value option or a dynamic value option;

wherein if the selected option is the fixed numerical value option, the value of the data protection level for the namespace is the value received from the user, and if the selected option is the dynamic value option, the value of the data protection level for the namespace is the set value of the system data protection level set for the system.

2. The establishing data protection level method according to claim 1, wherein each namespace includes a collection of data objects and has associated therewith a private file system with respect to other namespaces in the system.

3. The establishing data protection level method according to claim 1, wherein the value of the system data protection level for the system is received in response to a user input.

4. The establishing data protection level method according to claim 1, wherein the namespace includes a collection of data objects, wherein the value of the system data protection level for the system is set based on one or more of characteristics of storage devices in the system, whether the collection of data objects of the namespace have been replicated, whether the collection of data objects of the namespace are still under retention, and age of the data objects of the namespace.

5. The establishing data protection level method according to claim 1, wherein each namespace of the plurality of namespaces includes a collection of data objects; and wherein when one or more data objects of the namespace are replicated from the system to another system of the plurality of systems, the one or more data objects replicated in said another system have the value for the data protection level received from the user for the fixed numerical value option if the value of the data protection level is set according to the fixed numerical value option, and the one or more data objects replicated in said another system inherit the value of the system data protection level of said another system if the value of the protection level of the one or more data objects is set to the dynamic value option.

6. An apparatus for establishing data protection level in a system having a plurality of nodes and logically partitioned into a plurality of namespaces, the apparatus comprising:
a processor;
a memory to store a numerical value of a system dynamic data protection level; and
a data protection level value module configured to set a value of a system data protection level for the system, receive from a user a value of a data protection level for a namespace of the plurality of namespaces, and receive a selected option of a plurality of options for a data protection level to the namespace, the selected option for the data protection level being either a fixed numerical value option or a dynamic value option;
wherein if the selected option is the fixed numerical value option, the value of the data protection level for the namespace is the value received from the user, and if the selected option is the dynamic value option, the value of the data protection level for the namespace is the set value of the system data protection level set for the system.

7. The apparatus according to claim 6,
wherein each namespace includes a collection of data objects and has associated therewith a private file system with respect to other namespaces in the system.

8. The apparatus according to claim 7, further comprising:
a user interface to receive a user input for setting the value of the data protection level for the namespace containing one or more data objects in the system.

9. The apparatus according to claim 6, further comprising:
a user interface to receive a user input for setting the value of the system data protection level for the system.

10. The apparatus according to claim 6,
wherein each namespace of the plurality of namespaces includes a collection of data objects;
wherein the data protection level value module is configured, when one or more data objects of the namespace are replicated from the system to another system of the plurality of systems, to obtain the value of the system dynamic data protection level of said another system and assign the obtained value to be the value of the data protection level of the one or more data objects replicated in said another system, if the value of the protection level of the one or more data objects is set to the dynamic value; and
wherein the one or more data objects replicated in said another system have the value for the data protection level received from the user for the fixed numerical value option if the value of the data protection level of the one or more data objects is set to the fixed numerical value.

11. A non-transitory computer-readable storage medium storing a plurality of instructions executed by at least one processor to perform a method of establishing data protection level in a system having a plurality of nodes and logically partitioned into a plurality of namespaces, the method comprising:
setting a value of a system data protection level for the system;
receiving from a user a value of a data protection level for a namespace of the plurality of namespaces; and
receiving a selected option of a plurality of options for a data protection level to the namespace, the selected option for the data protection level being either a fixed numerical value option or a dynamic value option;
wherein if the accepted option is the fixed numerical value option, the value of the data protection level for the namespace is the value received from the user, and if the selected option is the dynamic value option, the value of the data protection level for the namespace is the set value of the system data protection level set for the system.

12. The non-transitory computer-readable storage medium according to claim 11, wherein receiving the selected option comprises displaying a drop-down menu providing selections of the dynamic value option and one or more fixed numerical values for the fixed numerical value option.

13. The non-transitory computer-readable storage medium according to claim 11,
wherein each namespace includes a collection of data objects; and
wherein the method further comprises:
displaying an area to receive a numerical value of the system data protection level of the system;
receiving the numerical value of the system data protection level of the system; and
displaying the received numerical value of the system data protection level of the system.

14. The non-transitory computer-readable storage medium according to claim 13, wherein the displaying an area to receive a numerical value of the system data protection level of a system displays a drop-down menu providing selections of a plurality of numerical values.

\* \* \* \* \*